Dec. 8, 1953  G. W. BRYAN  2,661,916
AIRPLANE LANDING GEAR
Filed Feb. 13, 1950  3 Sheets-Sheet 2
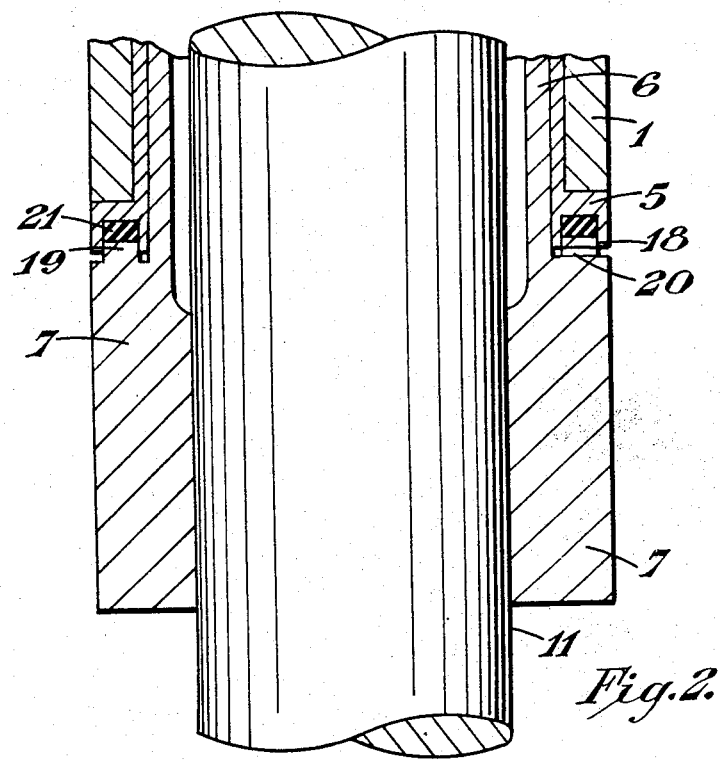
Fig. 2.
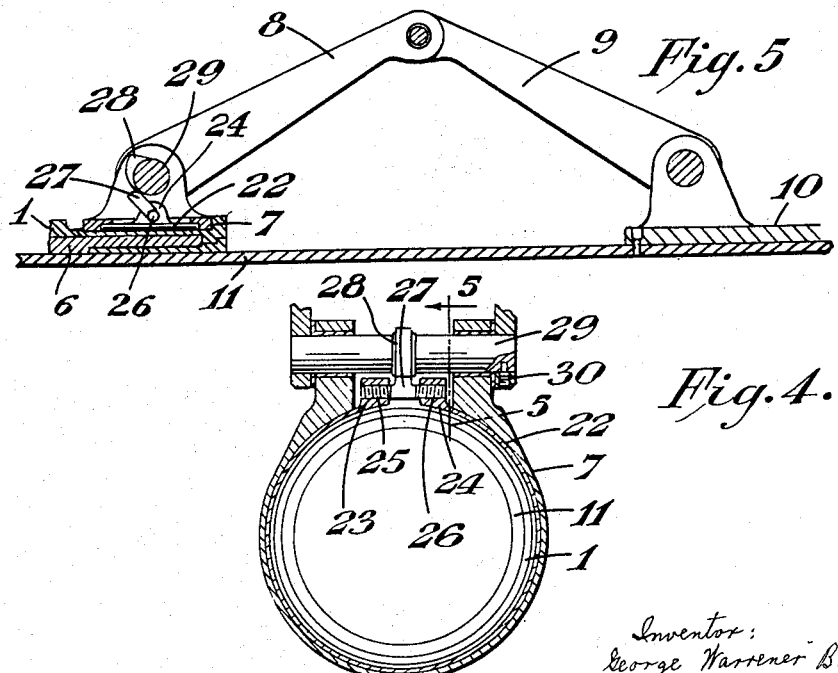
Fig. 5.
Fig. 4.
Inventor:
George Warrener Bryan;
By his attorneys,
Baldwin, Wight, & Prevost Dec. 8, 1953            G. W. BRYAN            2,661,916
AIRPLANE LANDING GEAR Filed Feb. 13, 1950            3 Sheets-Sheet 3

Inventor:
George Warrener Bryan;
By his attorneys,
Baldwin, Wight, & Brevost

Patented Dec. 8, 1953

2,661,916

UNITED STATES PATENT OFFICE 2,661,916

AIRPLANE LANDING GEAR

George Warrener Bryan, Warrington, England, assignor to Electro-Hydraulies Limited, Warrington, England, a company of Great Britain Application February 13, 1950, Serial No. 143,993

6 Claims. (Cl. 244—103)

This invention relates to aeroplane landing gear and concerns particularly the provision of means for damping oscillation of aircraft wheels, more particularly of tail and nose wheels of aircraft. Such wheels are, of course, mounted in a way to permit angular movement of the said wheels to alter their plane, so that the wheels are steerable and such wheels have the tendency to oscillate to an undesirable extent, such oscillation being frequently referred to as "shimmy." Shimmy also occurs in aircraft wheels which include a castering and self-centering device.

In aircraft landing gear it is known to provide frictional damping means in the shock absorber leg. Such damping means have been so arranged as to increase the exerted friction when the vertical load is increased and thus provide an anti-shimmy friction device which will exert a predetermined friction force to the landing gear wheels, when the vertical load on the said wheels is small, and will increase the said friction load on the wheels within predetermined limits, when the vertical load increases. This increase may vary in direct proportion or in some other predetermined way.

According to the present invention aircraft landing gear comprises damping means, which may be in the form of a friction disc, provided in the thrust face of the undercarriage leg casing, for example between the outer cylinder and inner cylinder of the undercarriage leg, and with the parts mechanically proportioned to allow play or relative movement for the friction disc to be placed in and out of action.

Figure 1:
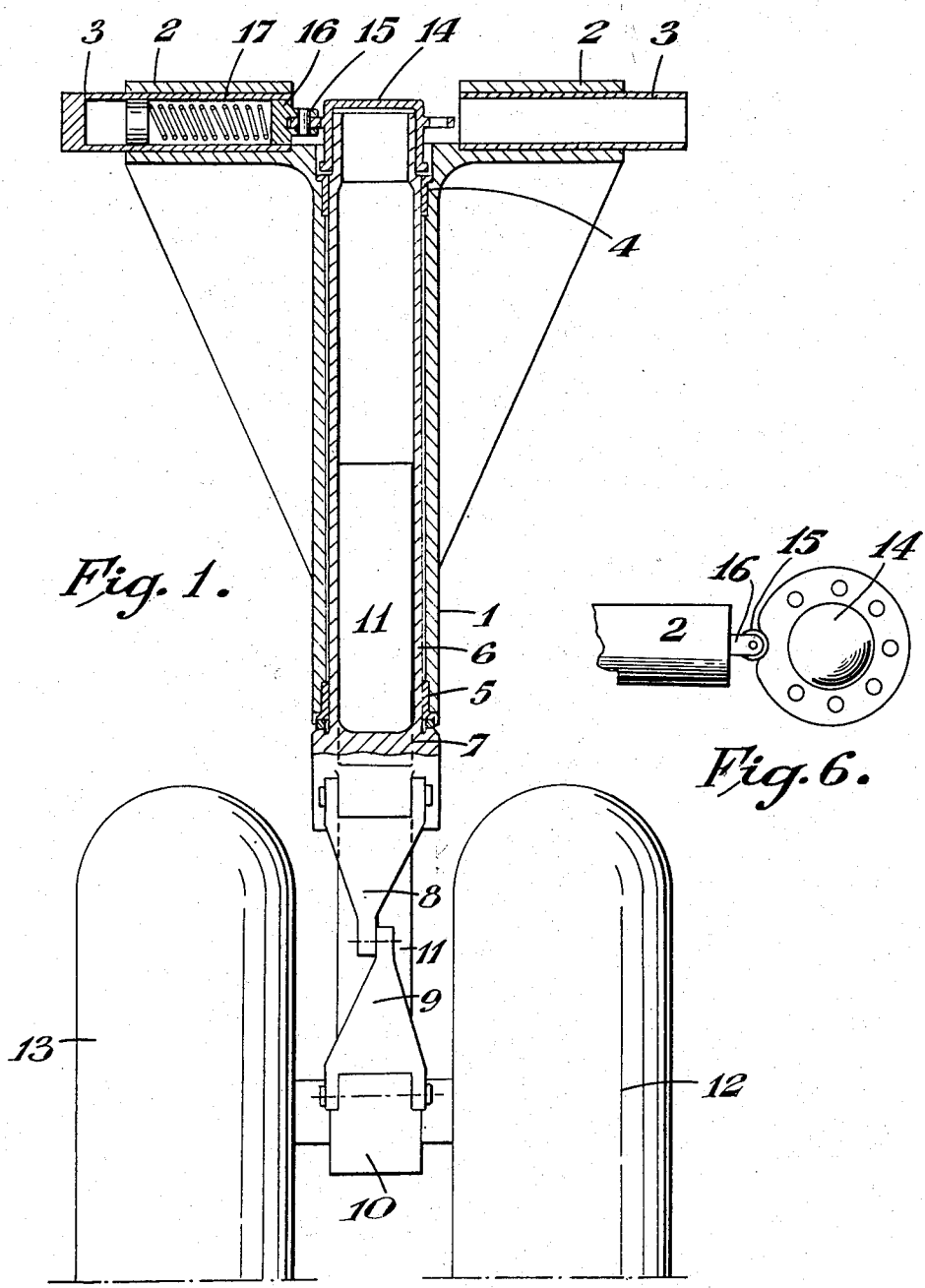
Figure 3:
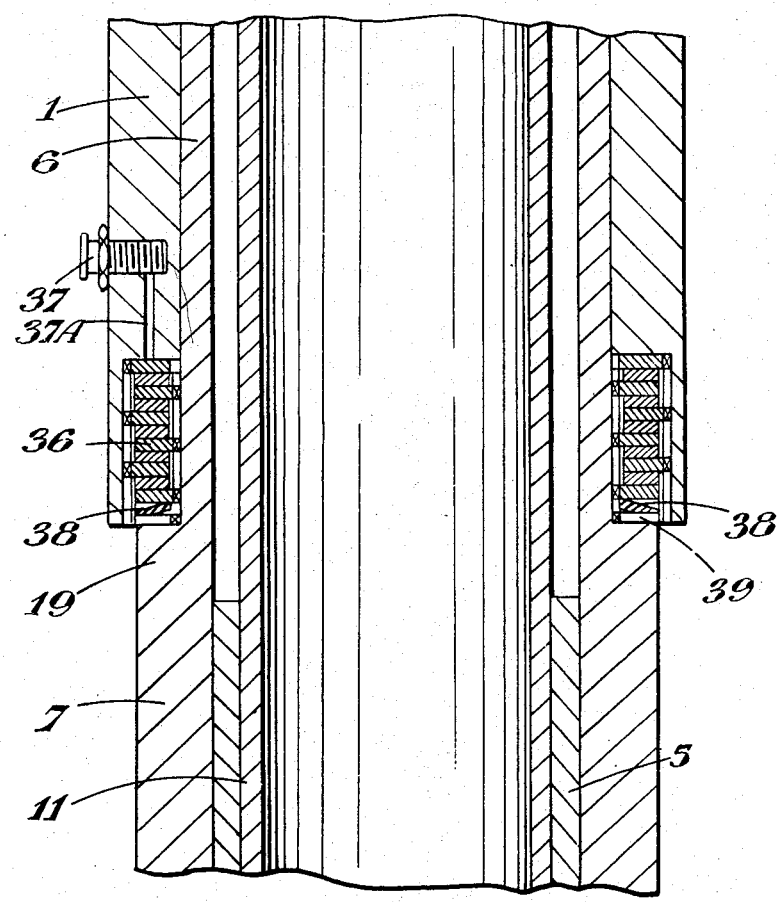

The invention is diagrammatically illustrated in the accompanying drawings in which Figure 1 is a part sectional elevation of one form of aircraft landing gear, Figure 2 being a detail section on an enlarged scale, and Figure 3 is a view similar to Figure 2 of a modification in which the friction means is preloaded by spring means, Figure 4 is a horizontal section of another form, Figure 5 is a part approximately central section thereof, and Figure 6 is a fragmentary top view illustrating the centering cam and roller associated with the landing gear.

Referring to the construction shown in Figures 1 and 2, this shows the invention applied to the nose wheel of an aircraft undercarriage; the undercarriage leg comprises a casing in the form of an outer cylinder 1 with its two cross arms 2 at the top, and bearings 3 for pivotal attachment to the aircraft. The outer cylinder also carries other bearings 4, 5 in which rotates the inner cylinder 6 which is either integral with or carried by a toggle bracket 7 which is connected by toggles 8, 9 to the axle bracket 10, which carries the sliding tube 11 of the landing gear and the wheels 12, 13. Inside the sliding tube 11 and affixed between the axle bracket 10 and the inner cylinder 6 is any suitable type of shock absorber (not shown). If desired, however, the sliding tube may itself constitute one of the telescopic parts of the shock absorber. Fixed to the inner cylinder 6 at the top thereof is a centering cam 14 biassed into its neutral position by a roller 15 carried by a piston 16 which is loaded by a spring 17, the piston being within one of the arms forming the cross head of the landing gear. In the lower bearing 5 of the outer cylinder is provided a recess 18, which co-operates with a circular boss or shoulder 19 on the toggle bracket 7, the boss being provided with suitable apertures 20 to allow any fluid or grease to flow away. Carried by or fixed to the boss or shoulder 19 is a ring shoulder 21 comprising one or more friction discs. The faces of the bearings 4 and 5 of the outer cylinder are preferably so arranged that there is some clearance, for example a few thousandths of an inch between the faces of the centering cam 14 and the top face of the toggle bracket 7 and friction ring 21.

It will be appreciated that when the aircraft is airborne, the upper surface of the bearing 4 carried by the upper end of the outer cylinder and the lower surface of the centering cam 14 make contact, so that the friction disc 21 is out of contact with the wall of recess 18 in the bearing 5 at the lower end of the outer cylinder 1, so that the anti-shimmy friction disc is out of action. Should, however, the aircraft touch down, the weight of the aircraft causes the face of the lower bearing 5 on the outer cylinder to contact with the friction disc 21. The friction between the friction disc 21 and the wall of the recess 18 will be sufficient to prevent or at least appreciably to reduce shimmy, but will not be sufficient to render the castoring self-centering means, or steering means, if these be employed, too difficult.

The constructions described with reference to Figures 1 and 2 may be modified to provide preloading of the friction means. The friction ring 21 consisting of one or more friction discs will normally be constructed of friction material of a type normally used on wheel brakes which becomes ineffective when greased. In Figure 3, which will now be described, the materials used as the friction material are steel combined with material known under the registered trade marks "Bakelite" or "Carobronse," and in order to avoid variation of friction between the contacting surfaces, due to accidental or unintentional greasing of said surfaces, they are kept greased whereby the friction is reduced but becomes more easily predictable for operational purposes. A number of these discs are generally indicated at 36 to form a shoulder at the base of outer cylinder 1 and a grease nipple 37 is provided in the outer cylinder 1 through which grease may be fed through a channel 37A, so that the contacting surfaces may be supplied with grease. At the base of the friction discs is provided a spring washer 38 resting on a washer 39, the said spring washer resting on a shoulder formed on the inner cylinder and providing preloading of the friction means. This preloading overcomes any possibility of initial shimmy which might occur and which might be difficult to damp when the nose or tail wheel is only lightly loaded.

In an alternative form shown in Figures 4 and 5 the toggle bracket 7 is bored and therein is provided a band in the form of a split ring 22, the free portions being formed with lugs 23, 24 adapted to receive in threaded connection arms 25, 26 of a lever 27. One of the threads is made left-handed and the other right-handed, so that, on movement of the lever 27 in one direction, the screw connection operates to force the lugs 23, 24 apart and thus increase any gap between them and therefore reduce frictional engagement between the band 22 and the outer cylinder 1, whilst movement in the other direction reduces the gap, thus altering the pressure of the friction band on the inner cylinder 6. Further, it is to be noted that the toggle bracket 7 is fixed to or carried by the inner cylinder 6. The friction band 22 resists relative motion between the outer cylinder 1 and the inner cylinder 6, and the band is held in the bracket 7 and therefore by the inner cylinder 6 and engages frictionally the outer cylinder 1. The lever 27 is controlled by a cam 28 carried by a toggle pin 29 to which is connected the upper toggle 8 of the two toggle links 8, 9 said connection being obtained by any suitable means for example a set screw 30. The cam preferably controls the lever through the intermediary of a suitable pin.

In Figure 5 the toggle 8 is shown in its position corresponding to the full extension of the leg, that is when the aircraft is airborne. Any closure of the leg will result in rotation of toggle 8 and therefore the pin 29 and the cam 28, depression of the lever 27, and increase of the friction load proportionate to the depression of the leg, which in turn varies with the vertical load.

If desired, pressure operated anti-shimmy devices can be used in addition to the friction means which, instead of being in the form of a disc, may comprise a plurality of single friction surfaces.

I claim:

1. In aircraft landing gear having a wheeled undercarriage and a leg, said leg comprising an outer cylinder, an inner cylinder rotatably castored in said outer cylinder having relative longitudinal play with respect thereto and a tube extending from the undercarriage and slidable relatively to said cylinders; toggle means extending from said undercarriage having an oscillation-damping means coacting with said tube operative to increase the degree of damping through increase in vertical load on the leg.

2. In aircraft landing gear according to claim 1, said cylinders having transverse shoulders, and said damping means being of disk form and disposed between said shoulders.

3. In aircraft landing gear according to claim 1, spaced shoulders on said cylinders and said damping means being a series of coacting annular friction disk members interposed between said shoulders.

4. Landing gear as claimed in claim 1, in which the damping means comprises a friction band surrounding the tube and being capable of adjustment to tighten it around the cylinder by movement of the toggles, thus increasing the braking force due to the closure of the leg, which closure of course in turn increases with an increase in vertical load, the proportion being reduced by the damping effect of the shock absorber.

5. Landing gear as claimed in claim 1 wherein the outer cylinder has a bored toggle bracket a band in the form of a split ring within said bore, the toggle being a two armed lever, each arm being in threaded connection with one free portion of said ring, the threads being oppositely handed so that on movement of the lever in one direction, the screw connection operates to force the free portions of the ring apart and thus apply smaller frictional engagement for the band, whilst movement in the other direction reduces the gap to alter the pressure of the friction band.

6. Landing gear as claimed in claim 1 wherein the outer cylinder has a bored toggle bracket a band in the form of a split ring within said bore, the toggle being a two armed lever, each arm being in threaded connection with one free portion of said ring, the threads being oppositely handed, a cam connected to the upper arm of said toggle for controlling said lever, so that on movement of the lever in one direction, the screw connection operates to force the free portion of the ring apart and thus apply smaller frictional engagement for the band, whilst movement in the other direction reduces the gap to alter the pressure of the friction band.

GEORGE WARRENER BRYAN.

References Cited in the file of this patent

UNITED STATES PATENTS

| Number | Name | Date |
| --- | --- | --- |
| 1,604,570 | Hardin | Oct. 26, 1926 |
| 1,614,742 | Heyser | Jan. 18, 1927 |
| 1,896,234 | Hathorn | Feb. 7, 1933 |
| 2,254,260 | Arcier et al. | Sept. 2, 1941 |
| 2,325,895 | Wallace | Aug. 3, 1943 |
| 2,356,463 | Parker | Aug. 22, 1944 |
| 2,376,676 | Foster | May 22, 1945 |
| 2,394,825 | Trader | Feb. 12, 1946 |
| 2,424,233 | Greenough | July 22, 1947 |
| 2,490,560 | Urquhart | Dec. 6, 1949 |

FOREIGN PATENTS

| Number | Country | Date |
| --- | --- | --- |
| 421,223 | Great Britain | Dec. 17, 1934 |
| 883,921 | France | Apr. 5, 1943 |